United States Patent [19]

Stern

[11] 4,098,553
[45] Jul. 4, 1978

[54] OBJECT RECONSTRUCTION BY USE OF PLURAL LENSES

[76] Inventor: Howard K. Stern, 89 Derby Ave., Greenlawn, N.Y. 11740

[21] Appl. No.: 741,763

[22] Filed: Nov. 15, 1976

[51] Int. Cl.² .................................. G01C 11/12
[52] U.S. Cl. ............................................. 356/2
[58] Field of Search .............. 350/130, 136, 320; 352/57, 58, 60; 353/6; 356/2

[56] References Cited

U.S. PATENT DOCUMENTS 3,783,294  1/1974  Koper .............................. 356/2 X Primary Examiner—Paul A. Sacher Attorney, Agent, or Firm—Watson, Leavenworth, Kelton & Taggart

[57] ABSTRACT

First and second lenses are spaced apart in a common plane and provide respective first and second recorded representations of radiant energy issuing from an object surface point or region. The first representation is displaced relative to the second in measure depending on such lens spacing to spatially locate the image location of the object surface point relative to the second lens. With lens focal length known and magnification now determinable, object surface point distance outwardly of the lens common plane may be computed. Since the ray from the image location to the second lens node is also spatially located, the object surface point spatial location is defined.

5 Claims, 4 Drawing Figures

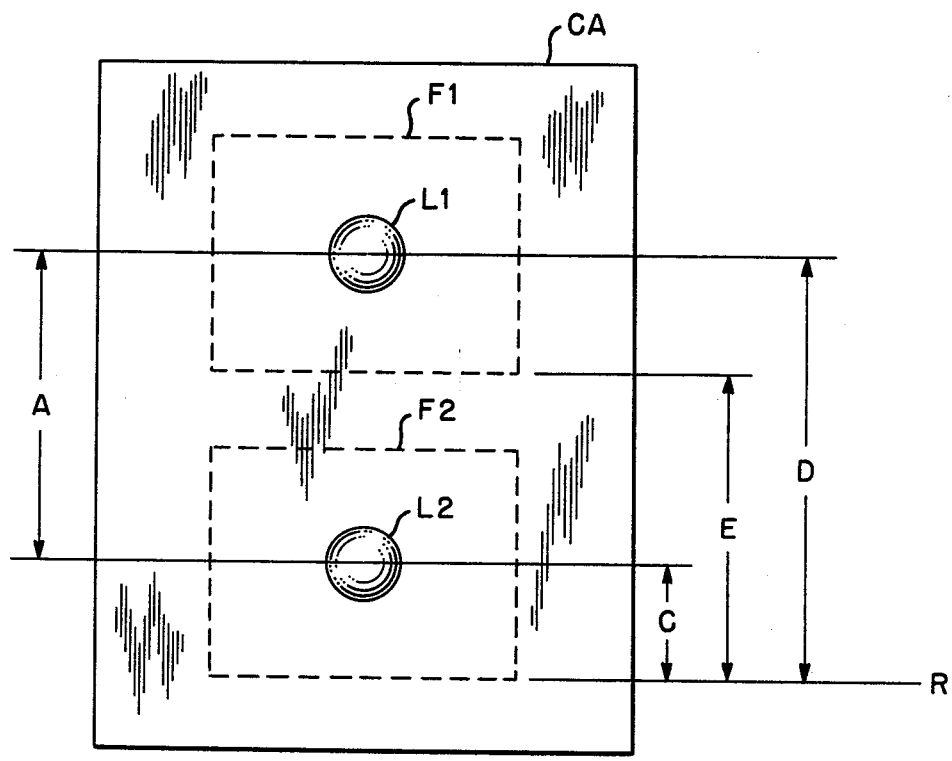
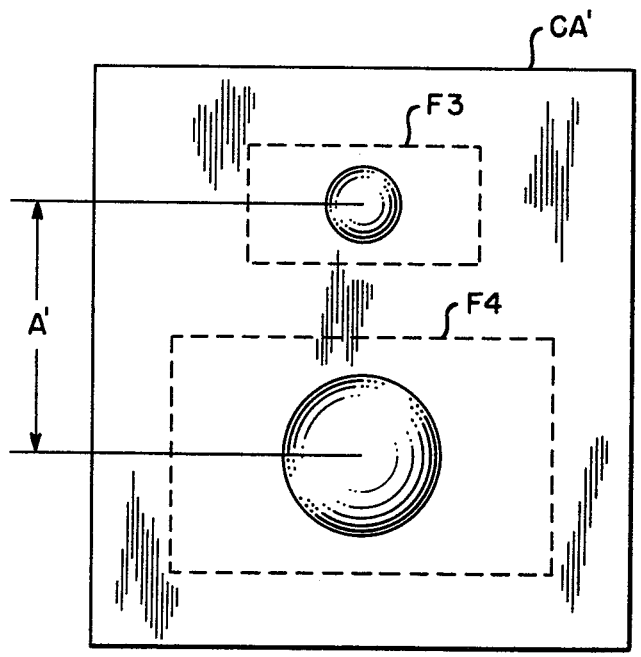

OBJECT RECONSTRUCTION BY USE OF PLURAL LENSES

FIELD OF THE INVENTION

This invention relates to methods for use in three-dimensional reconstruction of objects and, more particularly, to methods involving use of plural lenses in determining the spatial position of object surface points or regions.

BACKGROUND OF THE INVENTION

In long known practices, positional information respecting object surfaces as been obtained through stereoscopic examination. In such practices, typified by Koper U.S. Pat. No. 3,783,294, the surface is viewed through spaced lenses and photographs are made of the separate views. Characteristics, such as the slope of the surface, may be derived geometrically from the photographic renditions of the surface, for example, as in the Koper patent, by triangulation involving the ratio (X anamorph) of the lengths of the surface evidenced in the photographs.

SUMMARY OF THE INVENTION

An object of the present invention is to provide improved plural lens stereoscopic methods for use in three-dimensional reconstruction of objects.

In attaining the foregoing and other objects, the invention provides methods wherein plural lenses are spaced in a common plane so as to provide plural recorded representations of radiant energy issuing from an object surface point or region and one of such representations is displaced in measure dependent upon the spacing between the lenses in such common plane. By these practices, the image location of the object as viewed through one of the lenses is determinable. From this determination, object location in space is found from optics formulae.

The foregoing and other objects and features of the invention will be further understood from the following detailed description of preferred practices and from the drawings wherein like reference numerals identify like parts throughout.

DESCRIPTION OF THE DRAWINGS

FIG. 2 is a schematic diagram showing relative positioning of lenses and film frames in the FIG. 1 practice.

FIG. 4 is a schematic diagram showing relative positioning of lenses and film frames in the FIG. 3 practice.

DESCRIPTION OF PREFERRED PRACTICES

Figure 1:
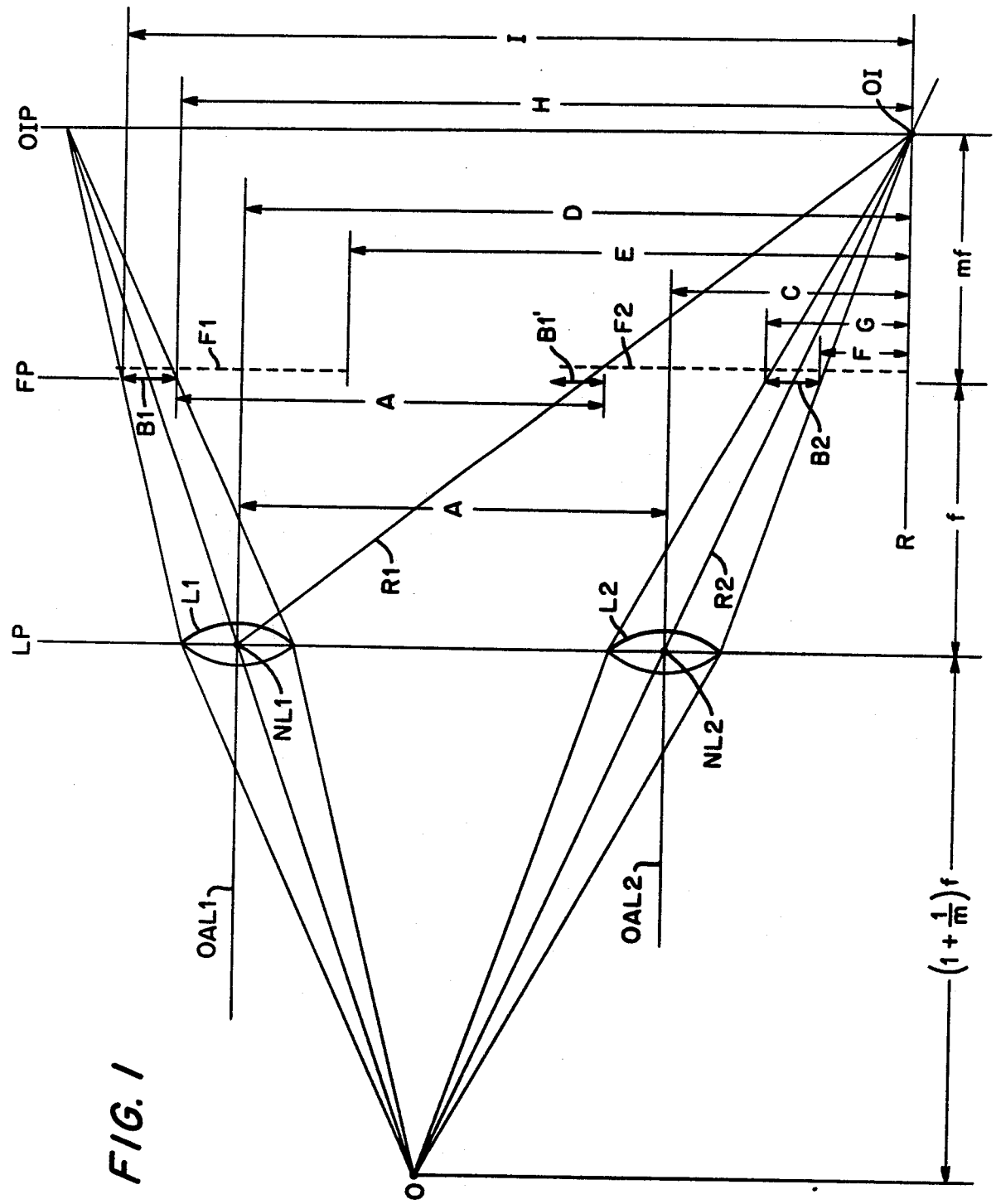
FIG. 1 is a schematic diagram illustrative of practice in accordance with the invention using lenses of like focal length.
Figure 3:
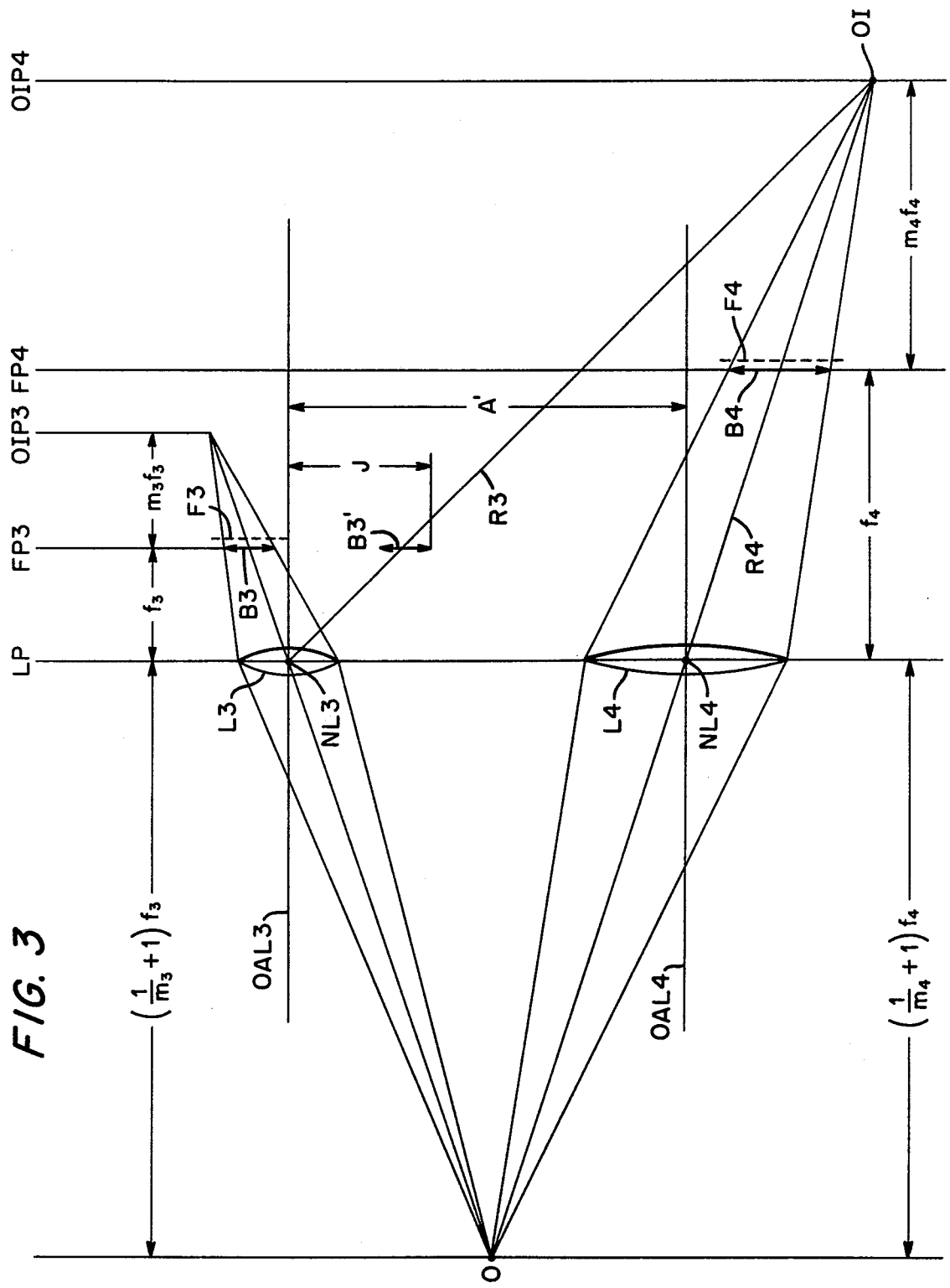
FIG. 3 is a schematic diagram illustrative of practice in accordance with the invention wherein lenses of different focal length are employed.

Referring to FIGS. 1 and 2 camera apparatus CA includes lenses L1 and L2 of the same focal length and film frames F1 and F2 disposed rearwardly of the lenses. Optical axes OAL1 and OAL2 are spaced apart by distance A. The lenses are situated with their transverse axes in common lens plane LP. Film frames F1 and F2 are both disposed in focal plane FP.

Object O, which may comprise an object surface point or region whose spatial location is desired to be known, is viewed jointly by lenses L1 and L2 whereby object representations B1 and B2 are formed on film frames F1 and F2 respectively, as shown in FIG. 1.

With representation B2 maintained fixed in its FIG. 1 location, representation B1 is displaced in focal plane FP toward optical axis OAL2 by the measure A, i.e., the spacing between the lens optical axes. A first line R1 is now drawn from node NL1 of lens L1 through the center of displaced object representation B1'. A second line R2 is drawn from node NL2 of lens L2 through the center of representation B2. The intersection of lines R1 and R2, namely, point OI defines the location of the image of object O with respect to lens L2.

With lens focal length ($f$) known and distance mf being measurable in FIG. 1, the magnification m may be determined. With these quantities known, the distance of object O leftwardly of lens plane LP, namely, $(1 + (1/m))f$, may be computed. Object O is accordingly known to be located along line R2 leftwardly of lens plane LP at such computed distance marked off orthogonally leftwardly of lens plane LP.

While the foregoing practice has been explained, by way of example, in terms of manipulatively displacing film frame F1, it will be appreciated that the practice may alternatively be accomplished by manual reconstruction of the drawing shown in FIG. 1, or by computerized computation, based on parameters established in constructing camera apparatus CA. Thus, the spacing (A) between the optical axes is established in the camera apparatus and may be determined by the difference between distances C and D relative to a common reference location R, conveniently a reference coincident with the bottom of film frame F2. Distance E locates the bottom of film F1 with respect to reference location R. Distances F and G, identifying the location of object representation B2 with respect to location R, are determinable from exposed and developed film frame F2. Distances H and I, identifying the location of object representation B1 with respect to location R are determinable from the exposed and developed film frame F1 and known distance E. The locations of lens nodes NL1 and NL2 relative to location R are set in camera apparatus CA.

It is to be noted that the above-discussed practice could alternately have been practiced by translating object representation B2 in focal plane FP by the measure A toward optical axis OAL1 with object representation B1 maintained in its FIG. 1 position. This practice would entail the drawing of the line from lens node NL2 through the center of displaced object representation B2. The intersection of that line and the line extending from lens node NL1 centrally through object representation B1 would define the location of the object image with respect to lens L1. The aforementioned practice may use more than two lenses in a cooperative manner to provide a single three-dimensional image to the right of the multiple lens plane. This practice is useful in object reconstruction by manual or automated means.

In selecting film frame location, one chooses a location where the object does not come to focus. In the above-discussed example in FIG. 1, the focal planes of lenses L1 and L2 are used as the film frame locations, object O being sufficientlyclose to the lenses that the object image does not come to focus at such focal planes but at a plane to the right of the focal planes. For objects which would have images in focus at the focal planes, the film frames are moved away from the focal planes and the camera apparatus may be equipped with intended in an illustrative and not in a limiting sense. The true spirit and scope of the invention is defined in the following claims.

What is claimed is:

1. In a method for spatial reconstruction of an object surface point, the steps of:
    (a) disposing first and second lenses in spaced relation in a common plane with each such lens in viewing relation to radiant energy issuing from said object surface point;
    (b) exposing first and second recording members to said radiant energy issuing respectively from said first and second lenses for providing first and second recorded representations of said object;
    (c) preselecting a measure of displacement of such first recorded object representation toward the optical axis of said second lens as a function of the spacing between said first and second lenses in said common plane; and
    (d) displacing such first recorded object representation toward the optical axis of said second lens in such preselected measure.

2. The invention claimed in claim 1 wherein said first and second lenses are selected to be of common focal length and wherein said step (c) is practiced by preselecting such measure in amount equal to the linewise spacing in said common plane of the optical axes of said first and second lenses.

3. The invention claimed in claim 2 including the further step of locating the intersection of a first line extending from the node of said first lens through the center of such displaced first recorded object representation and a second line extending from the node of said lens through the center of such second recorded object representation.

4. The invention claimed in claim 1 wherein said first and second lenses are selected to be of respectively different focal lengths and wherein said step (c) is practiced by preselecting such measure in amount equal to the linewise spacing in said common plane of the optical axes of said first and second lenses multiplied by the ratio of the focal length of said first lens to the focal length of said second lens.

5. The invention claimed in claim 4 including the further step of locating the intersection of a first line extending from the node of said first lens through the center of such displaced first recorded object representation and a second line extending from the node of said second lens through the center of such second recorded object representation.

* * * * *